United States Patent [19]

Singletary et al.

[11] 4,328,140

[45] May 4, 1982

[54] FLUOROELASTOMER PROCESSING AID

[75] Inventors: Michael P. Singletary, Goose City; James L. Fabian, North Charleston, both of S.C.

[73] Assignee: Raybestos-Manhattan, Inc., Trumbull, Conn.

[21] Appl. No.: 193,751

[22] Filed: Oct. 3, 1980

[51] Int. Cl.³ .............................................. C08K 5/09
[52] U.S. Cl. .................................. 524/322; 106/245; 106/268
[58] Field of Search ....................... 260/23 H, 23 XA; 106/243, 245, 268

[56] References Cited

U.S. PATENT DOCUMENTS

| | | | |
|---|---|---|---|
| 2,928,797 | 3/1960 | Brunson | 260/23 H |
| 3,520,842 | 7/1970 | Crean | 260/23 H |
| 3,538,028 | 11/1970 | Morgan | 260/23 XA |
| 3,565,840 | 2/1971 | Mirabile | 260/23 H |

OTHER PUBLICATIONS

Illmann, SPE Journal, Jun. 1967, pp. 71-77.

*Primary Examiner*—Paul R. Michl
*Attorney, Agent, or Firm*—Gary, Juettner & Pyle

[57] ABSTRACT

The processing, handling and other properties of fluoroelastomers are improved by the addition of effective amounts of oleic acid and low molecular weight polyethylene as processing aids.

2 Claims, No Drawings

FLUOROELASTOMER PROCESSING AID

BACKGROUND OF THE INVENTION

Fluoroelastomers classified as copolymers of vinylidene fluoride and hexafluoropropylene are relatively viscous in comparison to other elastomers. In order to process such elastomers on conventional equipment, such as mixers, calenders and extruders, it is known to incorporate various softeners and lubricants into the elastomer gum prior to processing and vulcanization.

The degree of effectiveness of conventional processing aids is considered as being proportional to the relative amount of the softener or lubricant that is incorporated into the fluoroelastomer. The use of high proportions of a processing aid, however, is not feasible because the aid remains in the elastomer and adversely affects the normally excellent properties of the final vulcanizate.

Various processing aids have been proposed, including a low molecular weight polyethylene. When used as a single additive, however, the polyethylene does not relieve the physical tension and nerve in fluoroelastomers.

Accordingly, the primary object of the present invention is to provide a fluoroelastomer processing aid composed of a plurality of components, which together provide a substantial improvement over conventional aids used in the same or comparable quantities. Another object is to provide such processing aid that will enhance, or will not significantly detract from, the properties of the vulcanizate.

SUMMARY OF THE INVENTION

In accordance with the present invention, an improved processing aid for fluoroelastomers is provided, the active portion of said processing aid comprising a mixture of a low molecular weight polyethylene and oleic acid in the proportions herein described. A thickener for the processing aid, such as powdered metal oxide or the like, is also beneficially used in the mixture to improve handling qualities thereof.

When mixed in effective amounts with a fluoroelastomer gum, the processing aid of the present invention provides several important benefits and improvements relative to the problems associated with the mixing, calendering, extruding and other processing of fluoroelastomers.

DESCRIPTION OF THE PREFERRED EMBODIMENT

The processing aid of the present invention is useful in connection with fluoroelastomers classified as copolymers of vinylidene fluoride and hexafluoropropylene. These copolymers are typically vulcanized with the aid of a metal oxide, such as magnesia, and a blocked difunctional amine as a curing agent. The fluoroelastomer may include various amounts of fillers and a low amount of a processing aid.

The processing aid of the present invention comprises a mixture of oleic acid and low molecular weight polyethylene. Other fatty acids, such as stearic, do not provide equivalent results. The polyethylene, a waxy material, preferably has a molecular weight within the range of 1500 to 10,000 a.m.u. (atomic weight units), with about 4,000 a.m.u. providing optimum results.

The amount of oleic acid relative to the amount of polyethylene employed can be varied and still obtain acceptable results, a suitable range being in the order of about 0.25 to about 4 parts oleic acid to one part of the low molecular weight polyethylene.

In order to facilitate handling and incorporation of the processing aid into the fluoroelastomer, it is preferred that a thickener be included in the mixture. The thickener is preferably a relatively inert inorganic solid, in powdered form, that is compatible with the fluoroelastomer and other additives. Suitable fillers include metal oxides, such as zinc oxide, aluminum oxide, calcium oxide, magnesium oxide, lead oxide, and others, such as diatomaceous earth, calcium silicate, talc and mixtures thereof. Typically an addition of from about one to about 15 percent by weight of thickener to the processing aid will provide the desired consistency.

As a preferred formula, the processing aid may comprise about 25 to about 40 percent oleic acid, from about 15 to about 45 percent low molecular weight polyethylene and from about one to about 15 percent powdered thickener. The materials may be mixed together over low heat and then cooled and stored until ready for use. The mixture is then incorporated into the elastomer by conventional elastomer mixing methods. Generally, from about 0.25 to about 10 parts of the processing aid per 100 parts fluoroelastomer will produce the desired results, with about 1 to about 3 parts being the optimum range. The elastomer is then processed in a conventional manner, such as by calendering, extruding, molding and the like to produce products of the desired shape or configuration.

The incorporation of the aforesaid processing aid into fluoroelastomers provides many substantial benefits, including significant improvement of milling and loading of ingredients, reduction of shrinkage in the uncured and cured elastomer, substantial reduction of the nerve of the rubber, reduction of heat build-up during calendering, improvement of flow and processing for extruded and molded goods, improvement of scorch time, in some cases by 50 percent, and reduction of critical temperature control on the calender.

What is claimed is:

1. Copolymers of vinylidene fluoride and hexafluoropropylene containing oleic acid and low molecular weight polyethylene in effective amounts as processing aids.

2. A method for improved processing of copolymers of vinylidene fluoride and hexafluoropropylene, said method comprising preparing a mixture comprising from about 0.25 to about 4 parts of oleic acid to one part low molecular weight polyethylene, and incorporating said mixture into said copolymers as a processing aid.

* * * * *